US012718632B2

(12) United States Patent
Zhang

(10) Patent No.: US 12,718,632 B2
(45) Date of Patent: Aug. 25, 2026

(54) METHODS FOR REMOTELY DIAGNOSING FAULTS IN POWERTRAIN OF ELECTRIC VEHICLES

(71) Applicant: CAROTA Technology Corporation, Shanghai (CN)

(72) Inventor: Xinjie Zhang, Shanghai (CN)

(73) Assignee: CAROTA Technology Corporation, Shanghai (CN)

( * ) Notice: Subject to any disclaimer, the term of this patent is extended or adjusted under 35 U.S.C. 154(b) by 40 days.

(21) Appl. No.: 18/934,138

(22) Filed: Oct. 31, 2024

(65) Prior Publication Data

US 2025/0054342 A1 Feb. 13, 2025

(30) Foreign Application Priority Data

Oct. 15, 2024 (CN) ......................... 202411434582.4

(51) Int. Cl.

*G07C 5/00* (2006.01)
*B60L 58/10* (2019.01)
*G07C 5/02* (2006.01)
*H01M 10/48* (2006.01)

(52) U.S. Cl.

CPC .............. *G07C 5/008* (2013.01); *B60L 58/10* (2019.02); *G07C 5/02* (2013.01); *H01M 10/486* (2013.01); *H01M 2220/20* (2013.01)

(58) Field of Classification Search

CPC ........ G07C 5/008; G07C 5/02; G07C 5/0808; B60L 58/10; H01M 10/486; H01M 2220/20; G05B 23/0262; G05B 2219/24065

See application file for complete search history.

(56) References Cited

U.S. PATENT DOCUMENTS 10,137,795 B2 * 11/2018 Petrosian ............. G07C 5/0808
11,132,853 B1 * 9/2021 Akhtar ................... G08G 1/202
2012/0303189 A1 11/2012 Namuduri et al.
2017/0144553 A1 * 5/2017 Steele ..................... H02M 3/04
2018/0058413 A1 * 3/2018 Jiang ..................... F02N 11/108

(Continued)

FOREIGN PATENT DOCUMENTS

CN 117192371 A 12/2023
TW 201623995 A 7/2016

OTHER PUBLICATIONS

Real-Time Anomaly Detection with AWS SageMaker & Kinesis Streams (Year: 2023).*

(Continued)

*Primary Examiner* — Adam R Mott
*Assistant Examiner* — Sagar Kc

(57) ABSTRACT

The disclosure provides a method for remotely diagnosing faults in a powertrain of an electric vehicle. The method can comprise collecting real-time data from the powertrain of the electric vehicle; transmitting the real-time data to a cloud platform; ranking a feature importance on the real-time data using a random forest model; optimizing hyperparameters of the random forest model using a simulated annealing algorithm; deploying the optimized random forest model on the cloud platform for real-time fault classification and diagnosis; and using the cloud platform to provide real-time fault alerts and diagnostic reports for the powertrain of the electric vehicle.

7 Claims, 2 Drawing Sheets

(56) References Cited

U.S. PATENT DOCUMENTS

| | | | | |
|---|---|---|---|---|
| 2020/0043258 | A1* | 2/2020 | Jiang | G07C 5/008 |
| 2022/0188665 | A1* | 6/2022 | Alabdullatif | G16C 20/70 |
| 2024/0386331 | A1* | 11/2024 | Yu | G06N 20/20 |
| 2025/0307503 | A1* | 10/2025 | Yang | G06F 30/27 |

OTHER PUBLICATIONS

Simulated Annealing (Year: 2023).*

Tuning Random Forest Parameters using Simulated Annealing for Intrusion Detection (Year: 2020).*

* cited by examiner

METHODS FOR REMOTELY DIAGNOSING FAULTS IN POWERTRAIN OF ELECTRIC VEHICLES

CROSS-REFERENCE TO RELATED APPLICATIONS

This application claims priority to Chinese patent application No. 202411434582.4, filed on Oct. 15, 2024, the contents of which are incorporated herein by reference.

BACKGROUND

The disclosure relates generally to automated fault diagnosis for vehicles. More specifically, the present invention relates to the detection of faults in electric vehicles, and particularly to methods for remote diagnosis of powertrain faults in electric vehicles.

Remote diagnosis of electric vehicle faults is a technology that employs communication technology and big data analysis for real-time monitoring and diagnosis of faults in electric vehicles. This technology employs a variety of components, including on-board sensors, data transmission modules, cloud servers and user interfaces. The on-board sensors are responsible for the collection of operational data from the electric vehicle's powertrain, including data pertaining to the status of the battery, the performance of the motor, and the parameters of the control system. The data are transmitted to the cloud server in real time via a data transmission module, such as a wireless or cellular network. In the cloud, specialized analytics software processes and analyzes the data, employing machine learning and artificial intelligence algorithms to identify potential faults and indications of performance degradation. User interfaces, such as smartphone applications or web-based dashboards, enable drivers or service technicians to remotely observe the status of the vehicle and receive notifications regarding faults.

The intricate structure and challenging operational conditions of electric vehicles render them susceptible to a range of faults, including those affecting the motor, DC/DC converter, and battery. It is therefore imperative that effective and real-time fault diagnosis is implemented in order to guarantee the safety and reliability of the vehicle.

SUMMARY

A first aspect of the disclosure provides a method for remotely diagnosing faults in a powertrain of an electric vehicle. In some embodiments, the method can comprise collecting real-time data from the powertrain of the electric vehicle; transmitting the real-time data to a cloud platform; ranking the real-time data in terms of a feature importance using a random forest model; optimizing hyperparameters of the random forest model using a simulated annealing algorithm; deploying the optimized random forest model on the cloud platform for real-time fault classification and diagnosis; and using the cloud platform to provide real-time fault alerts and diagnostic reports for the powertrain of the electric vehicle.

In some embodiments, the random forest model can perform the real-time fault classification and diagnosis based on a training set, an importance $I_j$ of a feature j in the training set be calculated by Formula I:

$$I_j = \frac{1}{T}\sum_{t=1}^{T} \Delta\text{Gini}(t, j) \quad \text{Formula I}$$

where ΔGini (t, j) being a reduced value of Gini index caused by feature j in decision tree t, and T being a total number of decision trees.

In some embodiments, the simulated annealing algorithm can optimize the hyperparameters of the random forest model through a cooling mechanism that uses a logarithmic cooling schedule.

In some embodiments, the logarithmic cooling schedule is calculated by Formula II:

$$T_n = \frac{T_i}{\log(1 + k \cdot \text{iter}) + \gamma \cdot \text{iter}^{\delta}} \quad \text{Formula II}$$

where $T_n$ being a temperature after iterations, $T_i$ being an initial temperature, k being a logarithmic growth constant, γ being an adjustment factor, δ being a power factor, and iter being a current number of iterations.

In some embodiments, the real-time data can comprise data from a DC/DC converter, a motor, and a battery of the electric vehicle. The real-time data can comprise a voltage, a current, a temperature, a pressure, or any combination thereof.

In some embodiments, the initial temperature can be 100 to 200, the adjustment factor γ can be 0.3 to 0.7. A plurality of iterations can be performed until the hyperparameters converge to an optimal solution.

In some embodiments, the cloud platform can be Amazon Web Services (AWS) cloud platform. The AWS platform can comprise AWS SageMaker Endpoint module and/or AWS CloudWatch module.

It should be understood that this disclosure does not intend to identify the key or important features of the embodiments of the disclosure, nor is it intended to limit the scope of the disclosure. Other features of the disclosure will become easily understood through the following description.

BRIEF DESCRIPTION OF THE DRAWINGS

The novel features of the present invention are specifically set forth in the appended claims. A better understanding of the features and advantages of the present invention will be obtained by referring to the following detailed description and drawings of illustrative embodiments utilizing the principles of the present invention.

DETAILED DESCRIPTION

Traditional methods for vehicle fault troubleshooting depend on standard fault codes generated by the vehicle computer (ECU) following a fault. Technicians can determine the cause of the fault and fix it by analyzing the fault codes and related log data. The fault code-dependent diagnostic approaches cover restricted range of failures.

The method of the disclosure for remotely diagnosing faults in electric vehicles can identify faults in electric vehicles in substantially real-time based on real-time data from on-board sensors of the electric vehicle using machine learning algorithms. The information regarding faults can then be conveyed to drivers and/or maintenance personnel in a timely manner, thereby enhancing the safety of driving. The method of the disclosure can be particularly suitable for the troubleshooting of electric vehicle powertrains.

Figure 1:
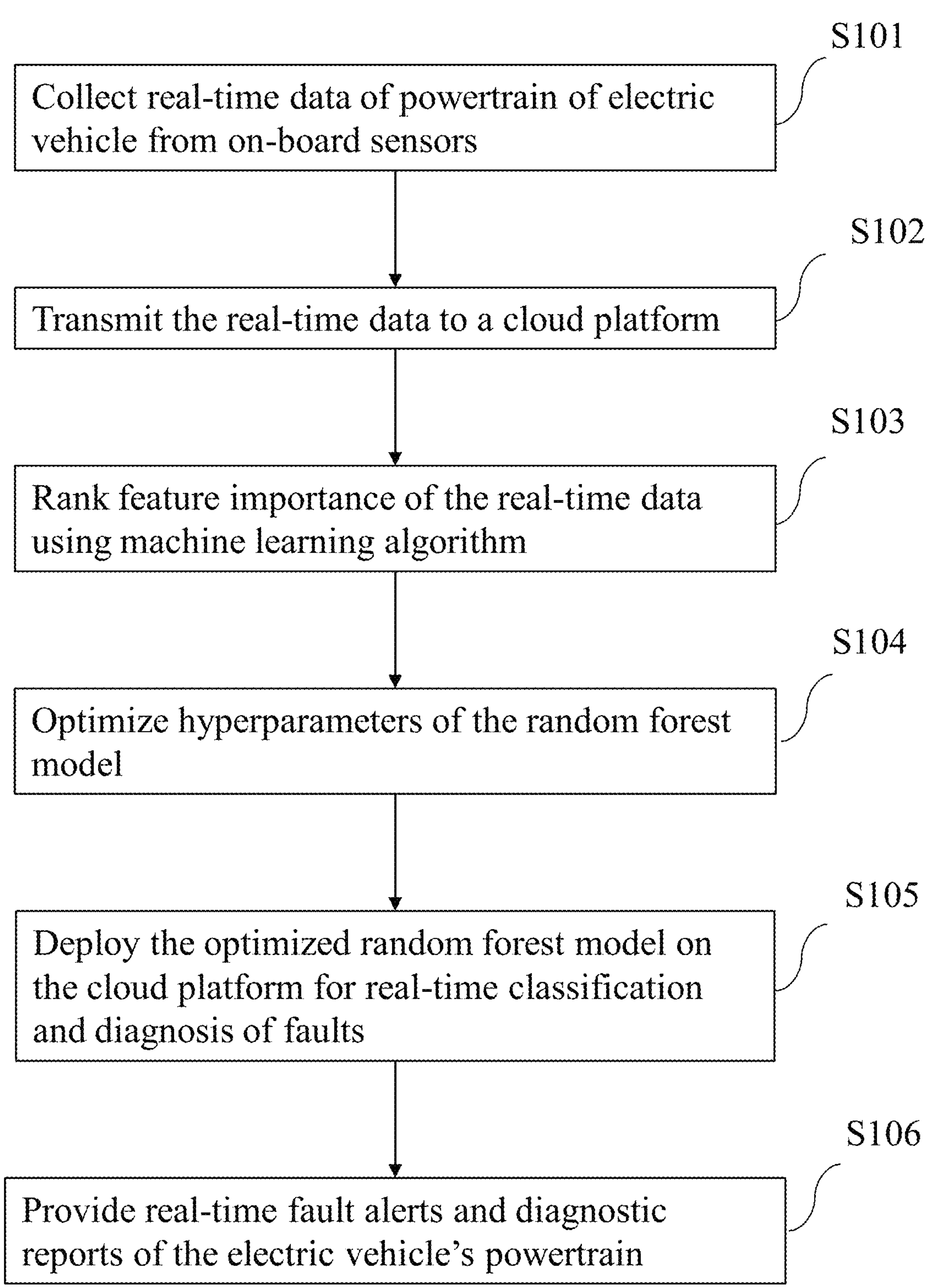
FIG. 1 is a flowchart illustrating a method for remotely diagnosing faults according to an embodiment of the disclosure.

As illustrated in FIG. 1, the disclosure provides a method for remotely diagnosing faults in an electric vehicle. In some embodiments, the method can comprise steps S101-S106. In step S101, real-time data of the powertrain of the electric vehicle can be collected from on-board sensors. The real-time sensor data can offer comprehensive insight into the present operational status of the electric vehicle's powertrain. The real-time data can comprise a voltage, a current, a temperature, a state of charge, and a state of health of the battery. The real-time data can comprise information regarding the battery, including a voltage, a current, a temperature, a state of charge (SOC), and a state of health (SOH) of the battery. Additionally, the real-time data can comprise information regarding the motor, including a temperature, a speed, and a torque of the motor. In step S102, the real-time data collected from the electric vehicle's powertrain can be transmitted to a cloud platform. The real-time data can be transmitted in real time via an on-board diagnostic interface (OBD-II) or a dedicated telemetry device and an on-board communication module. The cloud platform can be capable of providing real-time data processing and deployment of machine learning models. Examples of cloud platforms can comprise Amazon's AWS, Microsoft's Azure, Google Cloud, IBM Cloud, Oracle Cloud, Alibaba Cloud, Tencent Cloud, and Huawei Cloud. For example, Amazon's AWS provides a comprehensive suite of machine learning services and tools, including SageMaker. The Azure platform, developed by Microsoft, provides Azure Machine Learning services to support developers in the creation and training of machine learning models. The Google Cloud Platform offers an integrated, end-to-end machine learning platform, namely AI Platform, for the development and deployment of models.

In step S103, a machine learning algorithm can be utilized on the cloud platform to rank the feature importance on the real-time data. In some instances, the real-time data can be ranked in terms of feature importance through the use of a random forest model. The ranking can be implemented using a machine learning algorithm. Examples of machine learning algorithms can include random forests, gradient booster, and neural networks. The implementation of a feature importance ranking can enhance a predictive accuracy of the model, while simultaneously reducing a consumption of computational resources during feature selection process. This, in turn, can lead to an overall improvement in computing efficiency.

In some instances, the real-time data can be ranked according to the feature importance through the use of a random forest model. The random forest model can enhance the precision and reliability of predictions by constructing multiple decision trees and integrating their prediction outcomes. In the context of real-time data processing, random forests are capable of assessing the influence of each feature on the model's prediction outcomes, a process referred to as feature importance assessment. In this manner, the model is capable of identifying the features that exert the most significant influence on the prediction outcomes, while simultaneously excluding those features that are unimportant or noisy, thereby optimizing the performance of the model. The feature importance-based ranking can be of particular value in real-time systems, as it enables the immediate reflection of dynamic changes in data streams, thereby facilitating rapid decision-making.

In some instances, the random forest model of the disclosure can be capable of performing classification and diagnosis of faults based on a training set. In the context of real-time classification and diagnosis of faults, the random forest model can require a training set comprising historical data, covering both normal operations and instances of faults. Each decision tree can be trained on a random subset of the training set, thereby ensuring a diversity in the model. In the classification process, a new data point can be evaluated by each decision tree individually, and the final classification result can be determined by a voting or averaging procedure. In some instances, an importance $I_j$ of a feature j in the training set of the disclosure can be calculated by Formula I:

$$I_j = \frac{1}{T}\sum_{t=1}^{T} \Delta\text{Gini}(t, j), \qquad \text{Formula I}$$

where ΔGini (t, j) is a reduced value of Gini index caused by feature j in decision tree t, and T is a total number of decision trees. In other words, ΔGini (t, j) represents a change in Gini impurity resulting from a utilization of feature j in splitting in the $t^{th}$ tree. The importance of feature j can be measured by averaging the change in Gini impurity across all trees. The Gini impurity is a metric used to assess the purity of a node. A node with a high degree of purity is more likely to contain data belonging to the same category.

In step S104, hyperparameters of the random forest model can be optimized. The hyperparameters can comprise the number of decision trees, the maximum depth of the decision trees, the minimum number of samples required to split a node, and other related parameters. By adjusting these parameters, it is possible to regulate a complexity and degree of fitting of the model, thereby preventing overfitting or underfitting. For example, increasing the number of decision trees can augment the model's generalization capacity; however, this may increase the computational cost and the risk of overfitting. Modifying the minimum number of samples required for a split and the minimum number of leaf node samples can control a growth of the tree and prevent overly complex model structures, thereby reducing overfitting and enhancing the model's capacity to adapt to new data.

In some instances, a simulated annealing algorithm can be employed to optimize the hyperparameters of the random forest model. In optimizing the hyperparameters of the random forest model, the simulated annealing algorithm can calculate the objective function value of the new solution by randomly selecting an initial solution for the hyperparameters and then performing a small random perturbation to the current solution in each iteration. The simulated annealing algorithm can be capable of effectively exploring the global search space, and it has the potential to deviate from the locally optimal solutions, ultimately identifying a hyperparameter configuration that is close to the globally optimal. The application of the simulated annealing algorithm for the optimization of hyperparameters in random forest models (e.g., the number of decision trees, the depth of the decision trees, and the method of feature selection) can markedly enhance the prediction accuracy and generalization capacity of the random forest model on a given dataset.

In some instances, the simulated annealing algorithm can optimize the hyperparameters of the random forest model through a cooling mechanism. The cooling mechanism can employ a logarithmic cooling schedule. In the context of optimization, logarithmic cooling schedule is a cooling mechanism that reduces the temperature based on a logarithmic function. This approach allows for the rapid exploration of a vast range of parameter spaces during the initial stages, while subsequently conducting a more meticulous search to prevent a premature convergence on a locally optimal solution. This scheduling approach can allow the algorithm to achieve a balance between global search and local search, thereby finding an optimal compromise between computational efficiency and optimization ability. In some instances, the logarithmic cooling schedule can be calculated by Formula II:

$$T_n = \frac{T_i}{\log(1 + k \cdot \text{iter}) + \gamma \cdot \text{iter}^{\delta}}, \quad \text{Formula II}$$

where $T_n$ is a temperature after iterations, $T_i$ is an initial temperature, k is a logarithmic growth constant, γ is an adjustment factor, δ is a power factor, and iter is a current number of iterations. The parameters γ and δ are used to further control the rate at which the temperature decreases. In this manner, the temperature can decrease in a gradual manner with the number of iterations, thus increasing the probability that the algorithm identifies a globally optimal solution. he initial temperature $T_i$ is typically set to a high value at the outset of the algorithmic process, allowing for a larger search space during the initial stage, thereby reducing the likelihood of a premature converging on a locally optimal solution. A low temperature in the later stage can assist in fine-tuning and identifying the globally optimal solution. As the number of iterations (iter) increases, the value of the logarithmic function also increases, resulting in a gradual decrease in the temperature $T_n$. This approach can ensure a larger search space in the initial stages and a gradual convergence in the subsequent stages. The parameters γ and δ are employed to further fine-tune the rate of temperature decrease. By adjusting the values of γ and δ, a profile of the temperature decrease can be controlled in order to better align with the requirements of a given problem.

In step S105, the optimized random forest model can be deployed on the cloud platform for real-time classification and diagnosis of faults. The optimized random forest model can be capable of processing a large amount of data with greater efficiency, reducing the risk of overfitting, and enhancing the precision of fault detection. The deployment of the optimized model on the cloud platform allows for the exploitation of the substantial computational capabilities and adaptability of cloud computing, thereby facilitating real-time data processing and analysis. The cloud platform enables the model to continuously receive data and update its predictions in real time, thereby facilitating continuous status monitoring and immediate fault diagnosis of the electric vehicle's powertrain.

In step S106, the cloud platform deployed with the optimized random forest model can be used to provide real-time fault alerts and diagnostic reports pertaining to the powertrain of the electric vehicle. In the event of an anomaly in the powertrain of the electric vehicle, the cloud platform can promptly transmit a fault alert to the vehicle owner, accompanied by a comprehensive diagnostic report. he reports not only identify the issue but also suggest potential solutions, thus assisting the vehicle owner or maintenance technician in promptly locating and resolving the problem.

The following non-limiting embodiments of the disclosure provide examples of methods for remotely diagnosing powertrain faults in electric vehicles using machine learning algorithms. In the embodiments, different logarithmic cooling schedule parameters are subjected to evaluation within the cooling mechanism for the simulated annealing algorithm that is used to optimize the random forest model. The resulting optimization effects of these parameters for the simulated annealing algorithm are then subjected to comparison.

EXAMPLE 1

The method for remotely diagnosing a fault in powertrain of an electric vehicle of the disclosure is described with reference to FIG. 1. In step S101, real-time data of the powertrain of the electric vehicle can be collected from an on-board data acquisition device (such as a sensor, a bus, etc.), including a DC/DC output voltage (DCHV), a total battery pack voltage (PackVolt), and a motor current (MotorC). The DC/DC output voltage (DCHV) can be an output voltage of a DC-to-DC converter. The total battery pack voltage (PackVolt) can be used as an indicator of an energy state of a battery pack. The motor current (MotorC) can be used to evaluate an efficiency and a power consumption of a motor. In the exemplary Example 1, the collected real-time data can comprise: a DC/DC output voltage (DCHV): 330V; a total battery pack voltage (PackVolt): 700V; and a motor current (MotorC): 80 A.

In step S102, the collected real-time data of the electric vehicle's powertrain can be transmitted to a cloud platform, such as the Amazon Web Services (AWS) cloud platform, via the Internet or a communication network. For example, the real-time data of the electric vehicle's powertrain can be transmitted to the AWS IOT Core of the AWS cloud platform via the MQTT or HTTPS protocol, while the data can be stored in AWS S3 for storage. As the initial data often contains noise, a data quality can be improved by a data preprocessing, such as filtering and denoising. The initial data may be subjected to pre-processing at either the vehicle or the cloud. For example, AWS IoT Core has the capacity to facilitate real-time data analysis and processing, including the implementation of filtering and denoising algorithms. Once the data is cleaned and pre-processed, it can be integrated into a dataset that can be used for machine learning and data analysis, such as the feature importance-based ranking described in the disclosure.

In step S103, the real-time data can be ranked in terms of by feature importance using a random forest model. A random forest is an integrated learning method that makes predictions by constructing multiple decision trees.

The approach for constructing a random forest model can comprise the following stages.

Preparing Input Dataset D. The input dataset D can comprise multiple samples, each of which consists of a feature vector $x_i$ and a corresponding label $y_i$. In other words, the original dataset can be expressed as $D=\{(x_1, y_1), (x_2, y_2), \ldots, (x_n, y_n)\}$, where $x_i=(x_{i1}, x_{i2}, \ldots, x_{im})$ being the feature vector of the i-th sample, and $y_i$ being the corresponding label.

Random Sampling of Samples. Multiple samples can be randomly selected from the original dataset with replacement to construct a training subset. A decision tree may be constructed using each training subset.

Feature Subset Selection. For each decision tree, a portion of features (i.e., feature subsets) can be randomly selected from the feature set for node splitting. In some cases, $\sqrt{m}$ features can be selected, where m is the total number of features. This approach can mitigate the risk of overfitting for each tree while preserving the predictive power of the entire model.

Decision Tree Construction: A decision tree can be constructed using each training subset. In the construction of a decision tree, each node is split based on the selected subset of features. The construction of decision trees can be an independent process that does not affect the construction of other trees. The construction of a decision tree can employ the Gini Index (Gini Index) to identify the optimal subset of features for a given split. The formula for the Gini Index is as follows:

$$\text{Gini Index} = 1 - \sum_{i=1}^{C} q_i^2$$

where $q_i$ represents the proportion of category i in the current node, and C is the number of categories. The objective is to identify features that can be used to minimize the Gini index to split the node.

Repeating Process. Repeat the aforementioned steps k times in order to generate k decision trees.

In an embodiment of the disclosure, the initial random forest model can be trained with a training dataset prior to deployment. The training dataset can be derived from historical fault data of electric vehicles or from experimental tests and simulation data of electric vehicles. The data can be used to train the model to recognize a variety of fault types.

In the Example 1 of the disclosure, the preparation of the input dataset D can comprise the steps as follows.

Determining Features and Labels. In a random forest model, a feature vector $x_i$ of each sample represents an observed parameter or measurement value of the system. In Example 1, the features can comprise: [$x_{i1}$: DC/DC output voltage (DCHV)=330V]; [$x_{i2}$: battery pack total voltage (PackVolt)=700V]; [$x_{i3}$: motor current (MotorC)=80 A]. The label $y_i$ can represent the target value or classification result corresponding to the feature vector $x_i$. In the context of fault diagnosis, the label $y_i$ can be a binary value, indicating the presence or absence of a fault (for example, 0 indicating no fault, 1 indicating a fault) or a category value representing different fault types.

Constructing Input Dataset: Each sample in the dataset can comprise a feature vector $x_i$ and a label $y_i$. In the event that multiple samples from different monitoring data, each sample can form a row in the dataset. Example of a single sample can be represented as D={(330, 700, 80); 0)}, indicating the feature vector of one sample and the label "no fault" assigned to this sample. Example of multiple samples can be as follows: D={((330, 700, 80), 0), ((340, 710, 85), 1), . . . , ((320, 680, 75), 0)}.

Subsequently, the random forest model can be trained using the input dataset D. Each feature vector $x_i$ can be be used in a decision tree within the random forest to predict the label $y_i$. The label $y_i$ can be associated with detection or classification of faults.

Once the random forest model is trained, the random forest model can receive new monitoring data as input (e.g., new values of DCHV, PackVolt, MotorC) and predict the fault state (i.e., label $y_i$).

In the decision tree algorithm of the disclosure, an importance of a feature can be evaluated by examining the role of the feature in the splitting of tree nodes. If a feature significantly reduces the impurity, such as Gini impurity or information entropy, at the splitting point, then it can be considered as important for model prediction. In some instances, the importance $I_j$ of feature j in the training set of the disclosure can be calculated by Formula I:

$$I_j = \frac{1}{T}\sum_{t=1}^{T} \Delta\text{Gini}(t, j) \qquad \text{Formula I}$$

where ΔGini (t, j) is a reduced value of Gini index caused by feature j in decision tree t, and T is a total number of decision trees. In other words, ΔGini (t, j) represents a change in Gini impurity resulting from a utilization of feature j in splitting in the $t^{th}$ tree. The importance of feature j csan be measured by averaging the change in Gini impurity across all trees.

In step S104, the hyperparameters of the random forest model can be optimized. In some embodiments, the performance of the random forest model can be optimized by adjusting the parameters including the number of trees in the forest (i.e., the number of decision trees), the minimum number of samples required to split a node (i.e., the minimum number of split samples), and the minimum number of samples required for a leaf node (i.e., the minimum number of leaf node samples). These parameters can directly impact the complexity, accuracy, and sensitivity to different features of the model. Through adequate adjustment of these parameters, the performance of the random forest model can be, facilitating a more precise determination of feature importance. In some embodiments, the number of decision trees is 100, the minimum number of split samples is 5, and the minimum number of leaf node samples is 2.

In some instances, the hyperparameters of the random forest model can be optimized through a cooling mechanism. The cooling mechanism can employ a logarithmic cooling schedule to optimize the hyperparameters of the random forest model. The cooling mechanism can use a logarithmic cooling schedule. In some instances, the logarithmic cooling schedule can be calculated by Formula II:

$$T_n = \frac{T_i}{\log(1 + k \cdot \text{iter}) + \gamma \cdot \text{iter}^{\delta}} \qquad \text{Formula II}$$

where $T_n$ is a temperature after iterations, $T_i$ is an initial temperature, k is a logarithmic growth constant, γ is an adjustment factor, δ is a power factor, and iter is a current number of iterations. The parameters γ and δ are used to further control the rate at which the temperature decreases. In some examples, the initial temperature Ti is 100, the logarithmic growth constant k is 0.1, the adjustment factor γ is 0.5, and the power factor δ is 0.2. Following 10 rounds of iterations, the final optimization results of the above-discussed parameters in the random forest model are as follows: the number of decision trees is 150, the minimum number of split samples is 4, and the minimum number of leaf node samples is 3. As a result, the fault classification accuracy of the optimized random forest model is approximately 97.5%.

Figure 2:
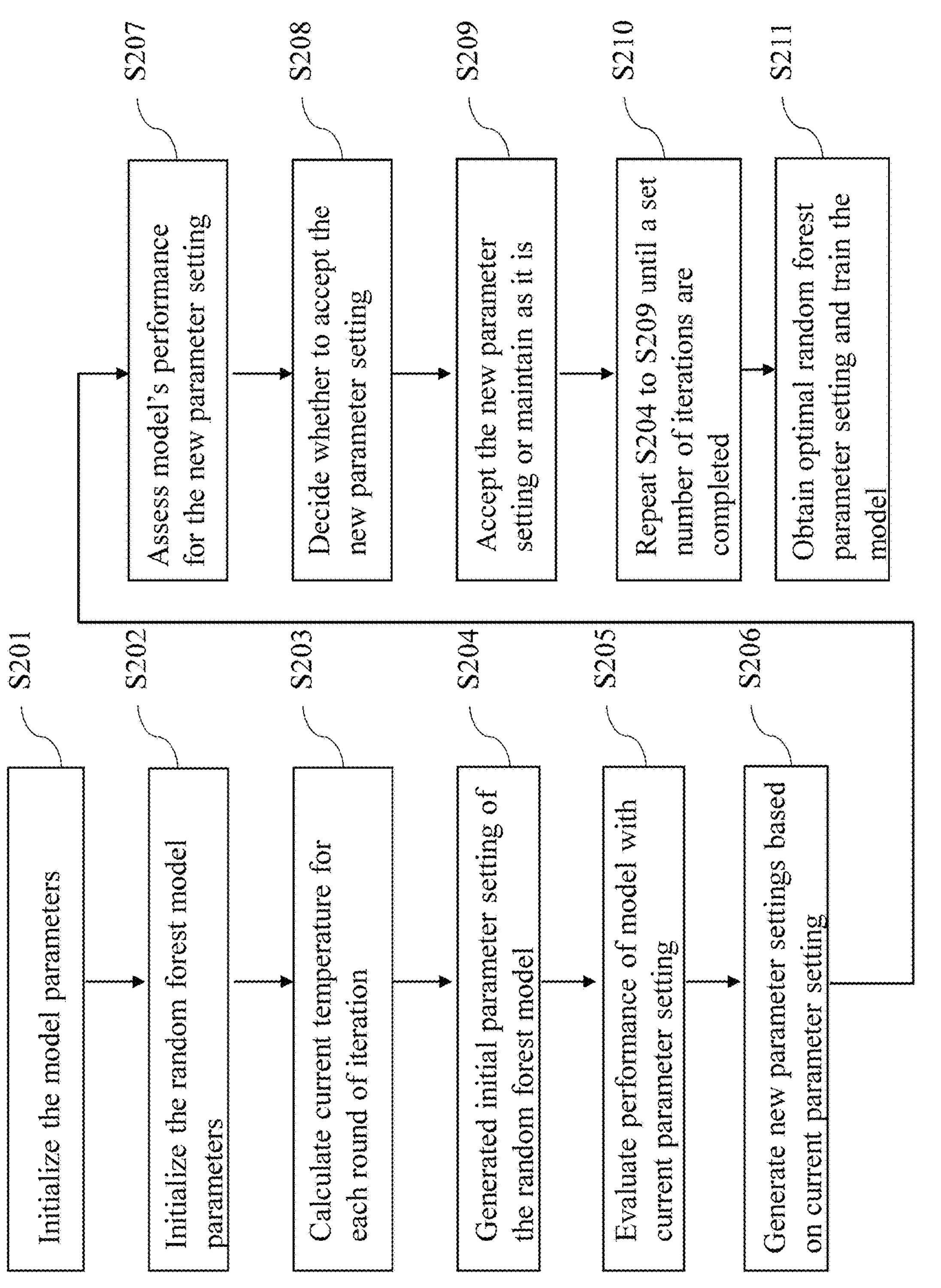
FIG. 2 is a flowchart illustrating a simulated annealing optimization random forest model according to an embodiment of the disclosure.

FIG. 2 illustrates a method for optimizing the parameters of a random forest model using a logarithmic cooling schedule. The method can comprise steps S201-S211. In step S201, the model parameters can be initialized. For example, the initial temperature, the logarithmic growth constant, the adjustment factor, the power factor, and the number of iterations can be initialized. In step S202, the random forest model parameters, including the number of decision trees, the minimum number of split samples, and the minimum number of leaf node samples, can be initialized. In step S203, the current temperature $T_n$ can be calculated for each round of iteration using Formula II:

$$T_n = \frac{T_i}{\log(1 + k \cdot \text{iter}) + \gamma \cdot \text{iter}^{\delta}} \quad \text{Formula II}$$

where iter is the current number of iterations.

In step S204, the initial parameter setting of the random forest model can be generated. The initial parameter setting can comprise, for example, the number of decision trees, the minimum number of split samples, and the minimum number of leaf node samples. In step S205, a performance of model with the current parameter setting can be evaluated. A cross-validation or alternative performance assessment methodology can be used to evaluate the model's performance with the current parameter setting. In the cross-validation approach, the generalization ability of the model is evaluated by dividing the dataset into several portions, with one portion used for training and the remaining portions for testing.

In step S206, a neighborhood search or a random perturbation can be performed based on the current parameter setting to generate new parameter setting. A neighborhood search is a method of exploring a small area around the current parameters with the objective of identifying parameter setting that may enhance the performance of the model. A random perturbation is employed to introduce a random factor into the current parameter setting, thereby facilitating a departure from the locally optimal solution and enhancing the probability of identifying the globally optimal solution. In step S207, the model's performance can be assessed for the new parameter setting. The evaluation of the model's performance can comprise testing the predictive ability of the model using a validation dataset to ensure that the new parameter setting improve the accuracy, efficiency and generalization ability of the model. The evaluation process can comprise calculating various model performance metrics, including precision, recall, F1 score, among others.

In step S208, a decision can be made regarding the acceptance of the new parameter setting. The decision can be made based on whether an improvement in the model's performance meets the predetermined goals and whether the new parameters provide a steady performance improvement without overfitting. In the event that the new parameters fail to provide a significant performance improvement or result in an overfitting, they can be rejected. Conversely, if the new parameter setting can enhance the model's performance while maintaining the model's complexity, then these new parameters can be accepted. In some instances, an acceptance probability function can be employed to determine whether the new parameter setting can be accepted. In some instances, the acceptance probability function can be calculated based on a difference between the model's performance of the with the current temperature $T_n$ and the new parameter setting and the model's performance with the current parameter setting. The acceptance probability function can be expressed as Formula III:

$$P = \exp\left(\frac{-\Delta E}{KT_n}\right) \quad \text{Formula III}$$

where P is the acceptance probability of the new parameter setting, ΔE is the difference between the model's performance with the new parameter setting and the model's performance with the current parameter setting, K is the Boltzmann constant, and $T_n$ is the current temperature. If the model's performance with the new parameter setting is superior, the new parameter setting can be immediately accepted. If the model's performance of the model with new parameter setting is inferior, the decision to accept the new parameters can be made based on the acceptance probability.

In step S209, if the new parameter setting is accepted, the current parameter setting can be updated to the new parameter setting; otherwise, the current parameter setting can be maintained as it is. In step S210, the process described in steps S204 to S209 can be repeated until a predetermined number of iterations are completed. In step S211, the optimal random forest parameter setting can be obtained once the predetermined number of iterations are completed, which can then be used to train the final model.

The simulated annealing algorithm of the disclosure is not limited to logarithmic cooling schedule, but may also be number cooling scheduling, linear cooling scheduling, power function cooling scheduling, logarithmic exponential scheduling, and other similar approaches.

In some embodiments, Amazon Web Services (AWS) SageMaker can be employed to train and optimize the random forest model.

In step S210, the optimized random forest model can be deployed on a cloud platform (e.g., AWS) for real-time classification and diagnosis of faults. In step S211, the cloud platform with the optimized random forest model deployed can be used to provide real-time fault alerts and diagnostic reports for the electric vehicle's powertrain.

EXAMPLE 2

The method for remotely diagnosing faults in electric vehicle's powertrain in Example 2 of the disclosure can be substantially the same as that described in Example 1. In Example 2, the real-time data collected can comprise: DC/DC output voltage (DCHV): 310V; total battery pack voltage (PackVolt): 690V; motor current (MotorC): 85 A. In the parameters of the random forest model, the number of decision trees is 120, the minimum number of split samples is 6, and the minimum number of leaf node samples is 2. With regards to the logarithmic cooling schedule parameters set forth in Formula II, the initial temperature $T_i$ is 150, the logarithmic growth constant k is 0.2, the adjustment factor γ is 0.3, and the power factor δ is 0.1. Following 15 rounds of iterations, the final optimization results for the above-discussed parameters in the random forest model are as follows: the number of decision trees is 180, the minimum number of split samples is 3, and the minimum number of leaf node samples is 2. As a result, the optimized random Forest model has a fault classification accuracy of approximately 98.1%.

EXAMPLE 3

The method for remotely diagnosing faults in electric vehicle's powertrain in Example 3 of the disclosure can be substantially the same as that described in Examples 1 and 2. In Example 3, the real-time data collected can comprise: DC/DC output voltage (DCHV): 320V; total battery pack voltage (PackVolt): 680V; motor current (MotorC): 78 A. In the parameters of the random forest model, the number of decision trees is 110, the minimum number of split samples is 5, and the minimum number of leaf node samples is 3. With regards to the logarithmic cooling schedule parameters set forth in Formula II, the initial temperature $T_i$ is 200, the logarithmic growth constant k is 0.05, the adjustment factor γ is 0.7, and the power factor δ is 0.3. Following 12 rounds of iterations, the final optimization results for the above-discussed parameters in the random forest model are as follows: the number of decision trees is 160, the minimum number of split samples is 4, and the minimum number of leaf node samples is 2. As a result, the optimized random Forest model has a fault classification accuracy of approximately 97.8%.

TABLE 1

Real-time data collected in Examples 1-3

| Example | DC output voltage (DCHV) | Total battery pack voltage (PackVolt) | Motor current (MotorC) |
|---|---|---|---|
| Example 1 | 330 V | 700 V | 80 A |
| Example 2 | 310 V | 690 V | 85 A |
| Example 3 | 320 V | 680 V | 78 A |

TABLE 2

Random forest model parameters and logarithmic cooling schedule parameters in Examples 1-3

| Example | Number of decision trees | Min. number of split samples | Min. number of leaf node samples | Initial temp $T_i$ | Log. growth constant k | Adjustment factor γ | Power factor δ |
|---|---|---|---|---|---|---|---|
| Example 1 | 100 | 5 | 2 | 100 | 0.1 | 0.5 | 0.2 |
| Example 2 | 120 | 6 | 2 | 150 | 0.2 | 0.3 | 0.1 |
| Example 3 | 110 | 5 | 3 | 200 | 0.05 | 0.7 | 0.3 |

TABLE 3

Parameters of the optimized random forest model and the fault classification accuracy of the model in Examples 1-3

| Example | Number of optimized decision trees | Optimized minimum number of split samples | Minimum number of leaf node samples | Fault classification accuracy |
|---|---|---|---|---|
| Example 1 | 150 | 4 | 3 | 97.5% |
| Example 2 | 180 | 3 | 2 | 98.1% |
| Example 3 | 160 | 4 | 2 | 97.8% |

In the random forest model, each parameter exerts an influence on the fault classification accuracy of the model. The data presented in Examples 1-3 prove that increasing the number of decision trees can enhance the fault classification accuracy of the model, suggesting that a greater number of decision trees can more effectively capture data features and patterns. A reduction in the minimum number of split samples can enhance the accuracy of fault classification by the model. A reduction in the minimum number of split samples can permit the model to perform more detailed splits, thereby facilitating the learning of subtle features within the data. Modifying the minimum number of leaf node samples can have a relatively minor impact on enhancing classification accuracy. Nevertheless, it remains an effective approach for maintaining a balance between the model's complexity and its capacity for generalization.

In the process of optimizing the hyperparameters of the random forest model using the simulated annealing algorithm, the parameters of the simulated annealing algorithm can have an impact on the fault classification accuracy of the final model. A higher initial temperature $T_i$ (e.g., 200) can facilitate a more exploratory optimization process at the outset, thereby reducing the likelihood of converging on a locally optimal solution. However, this approach may require a greater number of iterations to converge. A moderate initial temperature (e.g., 100 or 150) can typically facilitate a balanced convergence speed and accuracy. A larger logarithmic growth constant k (e.g., 0.2) can facilitate a more rapid reduction in temperature and enable the search process to converge at an earlier stage, thereby enhancing the classification accuracy to a certain extent. A smaller logarithmic growth constant k (e.g., 0.05) can facilitate a slower rate of temperature reduction, which enables a more refined search process. However, this approach may result in a relatively lower classification accuracy. A larger adjustment factor γ (e.g., 0.7) can facilitate greater temperature variation in each iteration, thereby enhancing the flexibility of the search process. A smaller factor (e.g., 0.3) can facilitate more stable temperature changes, which in turn helps to maintain the stability of the search process. A larger power factor δ (e.g., 0.3) can facilitate a more rapid temperature reduction, making it suitable for a shorter optimization process. A smaller factor (e.g., 0.1 or 0.2) can result in a slower rate of temperature reduction, allowing for a longer search time and the potential for identifying a more optimal solution.

The disclosure also provides a system including one or more computer processors and a computer readable memory. The computer readable memory can include machine executable code, which implements the method for remotely diagnosing faults in an electric vehicle's powertrain of the disclosure when executed by the one or more computer processors.

While preferred embodiments of the present invention have been shown and described herein, it will be obvious to those skilled in the art that such embodiments are provided by way of example only. Numerous variations, changes, and substitutions will occur to those skilled in the art without departing from the invention.

The invention claimed is:

1. A method for remotely diagnosing faults in a powertrain of an electric vehicle, the method comprising:

collecting real-time data from the powertrain of the electric vehicle;

transmitting the real-time data to a cloud platform;

ranking the real-time data in terms of a feature importance using a random forest model;

optimizing hyperparameters of the random forest model using a simulated annealing algorithm;

deploying the optimized random forest model on the cloud platform for real-time fault classification and diagnosis; and using the cloud platform to provide real-time fault alerts and diagnostic reports for the powertrain of the electric vehicle, wherein the random forest model performs the real-time fault classification and diagnosis based on a training set, an importance $I_j$ of a feature j in the training set be calculated by Formula I:

$$I_j = \frac{1}{T}\sum_{t=1}^{T} \Delta\mathrm{Gini}(t, j) \quad \text{Formula I}$$

wherein, ΔGini(t, j) being a reduced value of Gini index caused by feature j in decision tree t, and T being a total number of decision trees, wherein the simulated annealing algorithm optimizes the hyperparameters of the random forest model through a cooling mechanism that uses a logarithmic cooling schedule, wherein the logarithmic cooling schedule is calculated by Formula II:

$$T_n = \frac{T_i}{\log(1 + k \cdot \mathrm{iter}) + \gamma \cdot \mathrm{iter}^{\delta}} \quad \text{Formula II}$$

wherein, $T_n$ is a temperature after iterations, $T_i$ is an initial temperature, k is a logarithmic growth constant, γ is an adjustment factor, δ is a power factor, and iter is a current number of iterations.

2. The method of claim 1, wherein the real-time data comprises data from a DC/DC converter, a motor, and a battery of the electric vehicle.

3. The method of claim 2, wherein the real-time data comprises a voltage, a current, a temperature, a pressure, or any combination thereof.

4. The method of claim 1, wherein the initial temperature is 100 to 200, the adjustment factor γ is 0.3 to 0.7, and wherein a plurality of iterations are performed until the hyperparameters converge to an optimal solution.

5. The method of claim 1, wherein the cloud platform is AWS cloud platform.

6. The method of claim 5, wherein the AWS platform comprises AWS SageMaker Endpoint module.

7. The method of claim 5, wherein the AWS platform comprises AWS CloudWatch module.

* * * * *